(No Model.)
J. S. BOUGHER.
OIL AND GAS SEPARATOR.
No. 535,611. Patented Mar. 12, 1895.
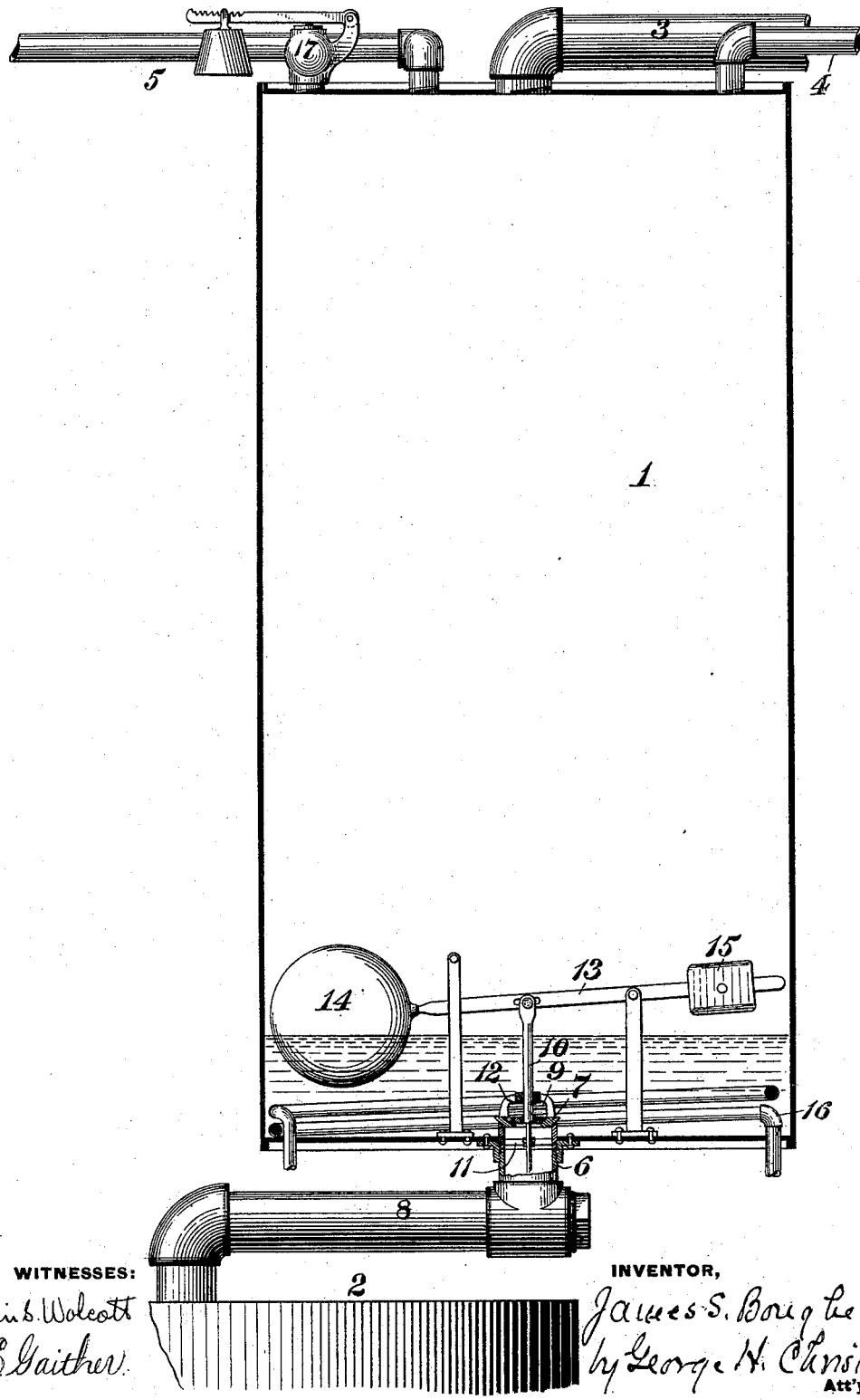
WITNESSES:
INVENTOR,
James S. Bougher
by George H. Christy
Att'y

UNITED STATES PATENT OFFICE.

JAMES S. BOUGHER, OF SHALER, ASSIGNOR OF THREE-FOURTHS TO T. A. & R. G. GILLESPIE, OF PITTSBURG, AND WILLIAM W. EVANS, OF PARKER'S LANDING, PENNSYLVANIA.

OIL AND GAS SEPARATOR.

SPECIFICATION forming part of Letters Patent No. 535,611, dated March 12, 1895.

Application filed November 16, 1893. Serial No. 491,098. (No model.)

*To all whom it may concern:*

Be it known that I, JAMES S. BOUGHER, a citizen of the United States, residing at Shaler township, in the county of Allegheny and State of Pennsylvania, have invented or discovered certain new and useful Improvements in Oil and Gas Separators, of which improvements the following is a specification.

The invention described herein relates to certain improvements in apparatus for separating oil and gas during the passage of the former from the well to the storage tank.

In all oil wells a considerable quantity of gas is found and it is desirable to effect a separation of the gas and oil before the oil enters the storage tank in order that the gas may be utilized under the boilers of the pumping engines.

The object of the present invention is to provide a suitable tank with automatically operating valves arranged with their operating mechanism within the tank so as to be protected from injury during the transportation of the tank from place to place.

It is a further object of the invention to provide a fluid seal for the valves to prevent any escape of the gas to the storage tank, and also to provide for the heating of the oil and gas in the separating tank.

In the accompanying drawing forming a part of this specification, is shown a sectional elevation of my improved automatic separator showing its connections to the oil well, the storage tank, and the pipe for connecting the separator to the boiler in the pump house.

In the practice of my invention the separating tank 1 is located in any suitable position with reference to the storage tank 2, and the well. The upper end of the tank is connected by a pipe 3 with the tubing and by a pipe 4 with the casing head of the oil well. A third line of pipe 5 extends from the upper end of the tank 1 for conducting the gas therefrom to the boiler of the pumping engine. In the lower end of the tank 1 is secured a tubular section 6, having its upper end suitably shaped to form a seat for the valve 7, while its opposite end is connected to a pipe 8 leading to storage tank 2. As shown, the valve 7 is provided with a central opening therethrough and the walls of said opening are suitably shaped to form a seat for the valve 9. This valve 9 is provided with a stem 10, whose lower end passes through a guide 11, while its upper end passes through the yoke 12 on the valve 7, and is connected to the lever 13. On one end of this lever is secured the float 14, which will rise as the oil flows into the tank and thereby lifts the small valve 9, and if the inflow of oil is greater than the outflow through the opening in the valve 7, the float will rise higher and thereby, through the engagement of the small valve 9 with the yoke 12, lift the valve 7. In order to cause the float to respond more promptly to a rise of oil in the tank 1, a counter balancing weight 15 is preferably attached to the opposite end of the lever 13, as shown, but this weight is not sufficient to lift the float and valves, when the float is not buoyed up by the oil.

In pumping wells, all the oil and the greater quantity of the gas is delivered to the separating tank through the pipe 3, the purpose of the pipe 4 being to convey so much of the gas as may escape past the packing into the well casing to the tank 1. As the gas and oil flow into the tank 1, they become separated from each other by reason of their difference in specific gravity, and as the oil rises in the tank the float is raised, first lifting the smaller valve 9, and then, in case the inflow is great, lifting the large valve 7.

It will be observed that, by reason of the arrangement of the float above the valves 7 and 9, the oil cannot be drained sufficiently from the tank to permit of the escape of gas through the pipe 8.

In very cold weather, it is found necessary to heat the oil in order that it may readily flow through the pipe lines. This heating has heretofore been effected by means of a steam coil in the storage tank 2, from whence the oil is pumped into the pipe lines. It is also necessary to heat the gas in order that it will readily flow through the delivery pipe 5. In order to effect the heating of both the oil and gas, a steam coil 16 is arranged in the lower end of the separating tank. This coil will thoroughly heat the oil and the gas will be heated by the oil.

The tank 1 is provided with an automatic relief valve 17 to maintain a constant pressure of gas in the tank and the pipe leading to the boiler.

I claim herein as my invention—

The combination of a tank having oil and gas inlet and outlet pipes arranged as described, a double valve controlling the outflow of oil, a float for controlling the movements of the members of the double valve in accordance with the inflow of oil, and a heating coil arranged within the tank, substantially as set forth.

In testimony whereof I have hereunto set my hand.

JAMES S. BOUGHER.

Witnesses:
DARWIN S. WOLCOTT,
F. E. GAITHER.